United States Patent
Yoshimura et al.

(10) Patent No.: US 12,528,921 B2
(45) Date of Patent: Jan. 20, 2026

(54) INORGANIC REINFORCED POLYAMIDE RESIN COMPOSITION

(71) Applicant: TOYOBO CO., LTD., Osaka (JP)

(72) Inventors: Nobuhiro Yoshimura, Shiga (JP); Kazuki Iwamura, Shiga (JP); Yoshitaka Ayuzawa, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 476 days.

(21) Appl. No.: 18/012,298

(22) PCT Filed: Jun. 24, 2021

(86) PCT No.: PCT/JP2021/023993
§ 371 (c)(1),
(2) Date: Dec. 22, 2022

(87) PCT Pub. No.: WO2022/009690
PCT Pub. Date: Jan. 13, 2022

(65) Prior Publication Data
US 2023/0265251 A1      Aug. 24, 2023

(30) Foreign Application Priority Data
Jul. 10, 2020   (JP) ................... 2020-119311

(51) Int. Cl.
*C08J 5/04*   (2006.01)

(52) U.S. Cl.
CPC ........... *C08J 5/043* (2013.01); *C08J 2323/06* (2013.01); *C08J 2377/10* (2013.01)

(58) Field of Classification Search
None
See application file for complete search history.

(56) References Cited

U.S. PATENT DOCUMENTS

2014/0363654 A1* 12/2014 Roth ............... C08L 77/02
524/133

FOREIGN PATENT DOCUMENTS

| | | |
|---|---|---|
| JP | 5-51529 | 3/1993 |
| JP | 05051529 | * 3/1993 |
| JP | 8-157714 | 6/1996 |
| JP | 2000-248172 | 9/2000 |
| JP | 2005-162775 | 6/2005 |
| JP | 2005-239800 | 9/2005 |
| JP | 2010-248406 | 11/2010 |
| JP | 2010-260889 | 11/2010 |
| JP | 2012136620 | * 7/2012 |
| JP | 2019-052323 | * 4/2019 |
| WO | 2008/075699 | 6/2008 |
| WO | 2015/174488 | 11/2015 |

OTHER PUBLICATIONS

Translation of JP 2019-052323 (Year: 2019).*
International Search Report (ISR) issued Sep. 7, 2021 in International (PCT) Application No. PCT/JP2021/023993.
Osamu Fukumoto, "Lecture on Plastic Materials [16], Polyamide Resin" published by Nikkan Kogyo Shimbun (1970), with English Translation of Relevant Part, in the specification.

* cited by examiner

*Primary Examiner* — Katarzyna I Kolb
(74) *Attorney, Agent, or Firm* — Wenderoth, Lind & Ponack, L.L.P.

(57) ABSTRACT

The present invention aims to provide an inorganic reinforced polyamide resin composition that achieves incompatible mechanical properties, i.e., high stiffness and impact resistance (high toughness), has excellent flowability, and further has excellent long-term wear resistance (high sliding performance) to an inorganic fiber reinforcing material used as a sliding counterpart material.

An inorganic reinforced polyamide resin composition containing: 10 to 55 mass % of a crystalline polyamide resin (A); 1 to 20 mass % of an amorphous polyamide resin (B); 40 to 70 mass % of an inorganic reinforcing material (C); and 0.5 to 10 mass % of a modified polyolefin resin (D) having a reactive functional group that is capable of reacting with a terminal group and/or a main-chain amide group of a polyamide resin, characterized in that a blending mass ratio between the components (A) and (D) satisfies $0.01 \leq (D)/(A) \leq 0.2$, and a blending mass ratio between the components (A) and (B) satisfies $0.05 \leq (B)/(A) \leq 0.7$.

2 Claims, No Drawings

INORGANIC REINFORCED POLYAMIDE RESIN COMPOSITION

TECHNICAL FIELD

The present invention relates to an inorganic reinforced polyamide resin composition having high stiffness and high toughness. More specifically, the present invention relates to an inorganic reinforced polyamide resin composition having excellent long-term wear resistance to a molded article used as a counterpart material, in which the molded article is made from a resin composition containing an inorganic reinforcing material.

BACKGROUND ART

Polyamide resins have excellent mechanical properties, heat resistance, impact resistance, and chemical resistance, and are widely used for automobile components, electric components, electronic components, household goods, and the like. Among the polyamide resins, a polyamide resin containing an inorganic reinforcing material represented by glass fibers is known to have greatly-improved stiffness, strength, and heat resistance. Particularly the stiffness thereof is known to be improved in proportion to the addition amount of the inorganic reinforcing material. Therefore, the inorganic fiber-reinforced polyamide resin composition is widely used for inner members and outer members in the fields of electronic and electric devices and automobiles. Particularly due to reduction in product thickness of electronic and electric members and in size of vehicle components, the required level of vibration properties is recently increasing.

The polyamide resins have not only excellent mechanical properties but also excellent wear resistance, and are therefore also widely used for sliding components in various fields including gears and camshaft bearings. In order to obtain more excellent sliding properties, it is known to blend a solid lubricant such as molybdenum disulfide, graphite, and a fluororesin, a liquid lubricant such as various lubricant oils and a silicone oil, and the like (for example, Non-Patent Document 1). Among these sliding improvers, the solid lubricants need to be blended in a large amount and have a drawback of remarkably lowering the toughness of the base polyamide resin. The liquid lubricants can impart highly effective sliding properties only in a relatively small blending amount. The liquid lubricants, however, have a drawback of having bad compatibility with the base resin in many cases. As a result, the liquid lubricants often stain the surface of a molded article and thus have a limited application.

As to a method for improving such drawbacks caused by blending various lubricants, proposed are a method for blending a modified styrene-based copolymer and modified high-density polyethylene having a molecular weight in a specific range (Patent Document 1); and a method for using a high-viscosity polyamide resin and blending a modified polyethylene (Patent Document 2).

Such polyamide resin compositions do not have the drawbacks, and it has become possible to provide a molded article having excellent sliding properties. These polyamide resins exhibit a large effect of improving the sliding properties when the counterpart material is a metal.

PRIOR ART DOCUMENTS

Non-Patent Document

Non-Patent Document 1: Osamu Fukumoto: "Lecture on Plastic Materials [16], Polyamide Resin" published by Nikkan Kogyo Shimbun (1970)

Patent Documents

Patent Document 1: Japanese Patent Application Laid-Open (JP-A) No. 157714/96
Patent Document 2: WO 2008/075699

DISCLOSURE OF THE INVENTION

Problem that the Invention is to Solve

Due to trends of reduction in thickness of molded articles and complication of shape of molded articles, high-stiffness and high-toughness materials are recently required. However, materials which have sufficient mechanical properties and can satisfy such a requirement have not been provided. In addition, with recent reduction in weight of molded articles, there are cases in which the counterpart material is not a metal but the same resin as the molded articles. Under these circumstances, when a large amount of an inorganic reinforcing material is charged into these polyamide resins so as to increase the stiffness, a problem occurs in which the inorganic reinforcing material present on the surface scrapes off the counterpart material. Therefore, it has been impossible to obtain materials sufficiently satisfying both high stiffness and high sliding performance.

The present invention has been conceived of in view of the present state of conventional techniques. An object of the present invention is to provide an inorganic reinforced polyamide resin composition that achieves incompatible mechanical properties, i.e., high stiffness and impact resistance (high toughness), has excellent flowability, and further has excellent long-term wear resistance (high sliding performance) to an inorganic fiber reinforcing material used as a sliding counterpart material.

Means for Solving the Problem

The inventors of the present invention have earnestly studied to achieve the object, focusing attention on the fact that the amount of wear in the sliding between inorganic reinforced polyamide resins is affected by the amount of an inorganic reinforcing material deposited on the surface of a molded article, and is greatly affected particularly by the amount of end surfaces and fracture surfaces of the inorganic reinforcing material projecting on the surface, and that brittleness of a resin portion caused due to an increased amount of the inorganic reinforcing material is a dominant factor. As a result, the inventors of the present invention have found that all the problems can be solved by blending an amorphous polyamide and a modified polyolefin in an inorganic reinforced polyamide resin composition in a balanced manner under multiple viewpoints, and thus completed the present invention.

Thus, the present invention has the following configurations.

[1]

An inorganic reinforced polyamide resin composition containing: 10 to 55 mass % of a crystalline polyamide resin (A); 1 to 20 mass % of an amorphous polyamide resin (B);

40 to 70 mass % of an inorganic reinforcing material (C); and 0.5 to 10 mass % of a modified polyolefin resin (D) having a reactive functional group that is capable of reacting with a terminal group and/or a main-chain amide group of a polyamide resin,
  characterized in that a blending mass ratio between the components (A) and (D) satisfies 0.01≤(D)/(A)≤0.2, and a blending mass ratio between the components (A) and (B) satisfies 0.05≤(B)/(A)≤0.7.

[2]

The inorganic reinforced polyamide resin composition according to [1], in which the crystalline polyamide resin (A) contains a crystalline polyamide resin (A1) and a crystalline polyamide resin (A2) having a melting point higher than a melting point of the crystalline polyamide resin (A1) by 20° C. or more, and a blending mass ratio between the components (A1) and (A2) is 0.1≤(A2)/(A1) ≤0.5.

[3]

The inorganic reinforced polyamide resin composition according to [1] or [2], in which the modified polyolefin resin (D) is a modified polyethylene resin.

[4]

The inorganic reinforced polyamide resin composition according to any of [1] to [3], in which the inorganic reinforcing material (C) is glass fibers having a number average fiber length of 140 μm or more.

Advantages of the Invention

The polyamide resin composition according to the present invention achieves incompatible mechanical properties, i.e., high stiffness and impact resistance, and can therefore be used in place of a metal or for thin molded articles. Also, the polyamide resin composition according to the present invention has excellent flowability and is further a high-stiffness and high-sliding material having excellent long-term wear resistance to an inorganic fiber reinforcing material used as a counterpart material. It is therefore possible to easily produce an inorganic reinforced polyamide resin composition that can be used for widely applied high-sliding components and can be used in place of a metal, and a molded article of the inorganic reinforced polyamide resin composition. Accordingly, the polyamide resin composition according to the present invention can realize unprecedented downsizing of housings of electronic and electric components, vehicle components used for the interior and exterior of vehicles, and the like.

BEST MODE FOR CARRYING OUT THE INVENTION

Hereinafter, the inorganic reinforced polyamide resin composition of the present invention will be described in detail.

In the present invention, the crystalline polyamide resin (A) is not particularly limited as long as it is a polymer having an amide bond (—NHCO—) in the main chain thereof and is crystalline. Examples of the crystalline polyamide resin (A) include crystalline polyamide resins such as polyamide 6 (NY6), polyamide 66 (NY66), polyamide 46 (NY46), polyamide 11 (NY11), polyamide 12 (NY12), polyamide 610 (NY610), polyamide 612 (NY612), poly meta-xylylene adipamide (MXD6), a hexamethylenediamine-terephthalic acid polymer (6T), a hexamethylenediamine-terephthalic acid and adipic acid polymer (6T/66), a hexamethylenediamine-terephthalic acid and ε-caprolactam copolymer (6T/6), a trimethylhexamethylenediamine-terephthalic acid polymer (TMD-T), a meta-xylylenediamine-adipic acid and isophthalic acid copolymer (MXD-6/I), a trihexamethylenediamine-terephthalic acid and ε-caprolactam copolymer (TMD-T/6), and a diaminodicyclohexylenemethane(CA)-isophthalic acid and lauryllactam copolymer, and a blended product thereof. The crystalline polyamide resin (A), however, is not limited to these examples. In the present invention, the crystalline polyamide resin (A) is preferably an aliphatic polyamide and more preferably polyamide 6 or polyamide 66. When two polyamides are used, it is preferred to use those having a melting point different from one another by 20° C. or more, in terms of controlling a solidification rate. Furthermore, the crystalline polyamide resin (A) is more preferred to contain a crystalline polyamide resin (A1) and a crystalline polyamide resin (A2) having a melting point higher than a melting point of the crystalline polyamide resin (A1) by 20° C. or more, and a blending mass ratio between the components (A1) and (A2) is 0.1≤(A2)/(A1)≤0.5. In one preferred aspect, the crystalline polyamide resin (A1) is polyamide 6 and the crystalline polyamide resin (A2) is polyamide 66.

The relative viscosity of the crystalline polyamide resin (A) in the present invention is not particularly limited, and it can be in a range of 1.5 to 3.5, measured with a 96% sulfuric acid solution (concentration of polyamide resin: 1 g/dl, temperature: 25° C.). The relative viscosity of the crystalline polyamide resin (A) in the present invention is preferably in a range of 1.5 to 3.3 and more preferably in a range of 1.5 to 2.8. The crystalline polyamide resin (A) having a relative viscosity in this range can impart to the resin composition such flowability that enables injection molding even when a large amount of the inorganic reinforcing material is charged into the resin composition. The crystalline polyamide resin (A) having such a relative viscosity also enables compact/thin molded articles to be molded and the resin composition to satisfy the toughness as a resin. Examples of a method for obtaining the polyamide resin having a relative viscosity of 1.5 to 3.5 include a method in which a polyamide resin having a relative viscosity of 1.8 to 3.5 is produced through polymerization under adjusted production conditions; and a method in which a polyamide resin having a relative viscosity of more than 3.5 is produced and then polyamide molecular chains are broken using a viscosity reducer. Aliphatic dicarboxylic acids, aromatic dicarboxylic acids, and the like are effective as the viscosity reducer. Specific examples of the viscosity reducer include oxalic acid, malonic acid, succinic acid, adipic acid, azelaic acid, sebacic acid, a phthalic acid, and terephthalic acid. The addition amount of the viscosity reducer is approximately 0.1 to 3 parts by mass of the viscosity reducer relative to 100 parts by mass of the polyamide resin. The viscosity reducer is blended to the polyamide resin, and the obtained mixture is melt-kneaded.

The content of the crystalline polyamide resin (A) in the polyamide resin composition according to the present invention is 10 to 55 mass %. It is preferably 15 to 45 mass % and more preferably 20 to 40 mass %.

The amorphous polyamide resin (B) used in the present invention does not exhibit a clear melting point when measured by a differential scanning calorimeter (DSC) in accordance with JIS K7121.

Specific examples of a monomer constituting the amorphous polyamide resin (B) include: diamines; dicarboxylic acids; and aminocarboxylic acids. Specific examples of the diamines include: bis(4-amino-cyclohexyl)methane (sometimes abbreviated as PACM), bis(3-amino-cyclohexyl)

methane, bis(3-methyl-4-amino-cyclohexyl)methane (sometimes abbreviated as MACM), 2,2-bis(4-amino-cyclohexyl)propane, isophoronediamine, tetramethylenediamine, hexamethylenediamine, undecamethylenediamine, dodecamethylenediamine, 2,2,4/2,4,4-trimethylhexamethylenediamine (TMD), 5-methylnonamethylenediamine, 1,3-bis(aminomethyl)cyclohexane, 1,4-bis(aminomethyl)cyclohexane, 3-aminocyclohexyl-4-aminocyclohexylmethane, 1-amino-3-aminomethyl-3,5,5-trimethylcyclohexane, bis(aminopropyl)piperazine, and bis(aminoethyl)piperazine. Specific examples of the dicarboxylic acids include: aliphatic dicarboxylic acids which have a linear chain or alkyl side chain having 4 to 36 carbon atoms such as adipic acid, suberic acid, azelaic acid, sebacic acid, undecanedioic acid, dodecanedioic acid (sometimes abbreviated as 12), tridecanedioic acid, and tetradecanedioic acid (sometimes abbreviated as 14); and aromatic dicarboxylic acids such as terephthalic acid (sometimes abbreviated as T), and isophthalic acid (sometimes abbreviated as I). Specific examples of the aminocarboxylic acids include: lactams such as ε-caprolactam, and ω-laurolactam (LL); and aminocarboxylic acids such as 6-aminocaproic acid, 11-aminoundecanoic acid, and 12-aminododecanoic acid.

Examples of a preferable combination of the monomers described above include a combination of an alicyclic diamine such as bis(4-amino-cyclohexyl)methane (PACM), bis(3-amino-cyclohexyl)methane, bis(3-methyl-4-amino-cyclohexyl)methane (MACM), and 2,2-bis(4-amino-cyclohexyl)propane, with a dicarboxylic acid such as undecanedioic acid, dodecanedioic acid, tridecanedioic acid, and tetradecanedioic acid. A specific form of the combination is, for example, a polymer, a copolymer, a blended product, or the like such as 12MACM, 14MACM, 10MACM/11, 12MACM/I, I/MACM/LL, T/TMD, and 6T6I, but is not limited to these examples.

For example, when the crystalline polyamide resin (A) is polyamide 6, the amorphous polyamide resin (B) is preferably 6T6I.

The relative viscosity (96% sulfuric acid method) of the amorphous polyamide resin (B) is not particularly limited, but is preferably 1.8 to 2.4, and more preferably 1.9 to 2.2.

The content of the amorphous polyamide resin (B) in the polyamide resin composition according to the present invention is 1 to 20 mass %. When the blending amount of the amorphous polyamide resin (B) is less than 1 mass %, a cooling solidification rate of the polyamide resin composition in a mold becomes excessively high, resulting in an increase in appearance defects such as filler floating and flow marks and a degradation of the wear resistance.

On the other hand, when the blending amount of the amorphous polyamide resin (B) is more than 20 mass %, the cooling solidification rate becomes excessively low, resulting in a deterioration of a mold releasability. Accordingly, a molded article adheres to a mold and thus cannot be released from the mold, or mold-release creases are generated on the surface of a molded article. Further, the crystallizability of the polyamide resin composition becomes excessively deteriorated, possibly leading to a decrease of mechanical strength and impact strength. The content of the amorphous polyamide resin (B) is preferably 2 to 15 mass % and more preferably 3 to 10 mass %.

In the present invention, the mass ratio between the components (A) and (B) needs to satisfy the following inequality.

$$0.05 \leq (B)/(A) \leq 0.7$$

In the present invention, by setting the mass ratio (B)/(A) to this range, a molded article having higher-level good appearance can be obtained. The mass ratio (B)/(A) is preferably 0.08 or more and 0.4 or less, and more preferably 0.10 or more and 0.2 or less.

The inorganic reinforcing material (C) in the present invention most effectively improves the physical properties such as strength, stiffness, and heat resistance. Specific examples of the inorganic reinforcing material (C) include: fibrous materials such as glass fibers, carbon fibers, alumina fibers, silicon carbide fibers, and zirconia fibers; whiskers such as aluminum borate and potassium titanate; needle-shaped wollastonite; and milled fibers. In addition to these examples, the following filling materials can also be used as the inorganic reinforcing material (C): glass beads, glass flakes, glass balloons, silica, talc, kaolin, wollastonite, mica, alumina, hydrotalcite, montmorillonite, graphite, carbon nanotube, fullerene, zinc oxide, indium oxide, tin oxide, iron oxide, titanium oxide, magnesium oxide, aluminum hydroxide, magnesium hydroxide, red phosphorus, calcium carbonate, potassium titanate, led zirconate titanate, barium titanate, aluminum nitride, boron nitride, zinc borate, aluminum borate, barium sulfate, magnesium sulfate, and a layered silicate on which an organic treatment has been performed for delamination. Among these examples, glass fibers, carbon fibers, and the like are particularly preferably used. These materials as the inorganic reinforcing material (C) may be used singly, or two or more thereof may be used in combination.

When a fibrous reinforcing material is used as the inorganic reinforcing material (C), glass fibers, carbon fibers, and the like are particularly preferably used among the examples described above. These fibrous reinforcing materials are preferably preliminarily treated with a coupling agent such as an organic silane-based compound, an organic titanium-based compound, an organic borane-based compound, and an epoxy-based compound. Those that easily react with a carboxylic acid group or/and a carboxylic acid anhydride group are particularly preferable. The polyamide-based resin composition in which glass fibers treated with a coupling agent are blended can give a molded article having excellent mechanical properties and excellent appearance properties and is therefore preferable. As to the other fibrous reinforcing materials, when having not been treated with a coupling agent, the fibrous reinforcing materials can be used by adding a coupling agent later.

When glass fibers are used as the inorganic reinforcing material (C), chopped strands obtained by cutting glass fibers at a fiber length of about 1 to 20 mm can be preferably used. Regarding a cross-sectional shape, glass fibers having a circular or non-circular cross-section can be used. Glass fibers having a non-circular cross-section are preferable in terms of physical properties. The non-circular cross-section of the glass fibers includes a substantial ellipse shape, a substantial oval shape, and a substantial cocoon shape at the cross-section perpendicular to the fiber-length direction. A flatness thereof is preferably 1.5 to 8. Here, the term flatness is defined as follows. Assuming a minimum-area rectangle circumscribed around the cross-section perpendicular to the longitudinal direction of the glass fibers, the length of a long side of the rectangle is defined as the major axis and the length of a short side is defined as the minor axis. Then, the term flatness is defined as a ratio of major axis/minor axis. The thickness of the glass fibers is not particularly limited, but the minor axis is about 1 to 20 μm and the major axis is about 2 to 100 μm.

The number average fiber length of the glass fibers in the polyamide resin composition of the present invention is preferably 140 to 700 μm and more preferably 180 to 400 μm. When the glass fiber length is in this range, the polyamide resin composition has high strength, high stiffness, and stable flowability. When the glass fiber length is out of the range, it is difficult to fill the glass fibers on the surface of the polyamide resin in an oriented manner. As a result, there is a fear that the end surfaces of the glass fibers are exposed to the surface, whereby the wear resistance is decreased.

The glass fibers are preferably treated with a coupling agent such as a silane-based or titanate-based coupling agent. Particularly, those treated with a silane-based coupling agent can preferably be used.

Examples of a preferable silane-based coupling agent include γ-glycidoxypropyltrimethoxysilane, γ-glycidoxypropylmethyldiethoxysilane, β-(3,4-epoxycyclohexyl)ethyltrimethoxysilane, γ-anilinopropyltrimethoxysilane, γ-(2-aminoethyl)aminopropyltrimethoxysilane, γ-methacryloxypropyltrimethoxysilane, vinyltrimethoxysilane, and γ-mercaptopropyltrimethoxysilane. Particularly preferred are γ-glycidoxypropyltrimethoxysilane, γ-anilinopropyltrimethoxysilane, γ-(2-aminoethyl)aminopropyltrimethoxysilane, and γ-methacryloxypropyltrimethoxysilane.

The blending amount of the inorganic reinforcing material (C) is 40 to 70 mass %, preferably 45 to 67 mass %, more preferably 50 to 65 mass %, and further preferably 55 to 65 mass %, relative to 100 mass % of the total resin composition. When the blending amount of the inorganic reinforcing material (C) is more than 70 mass %, the productivity is deteriorated. When the blending amount of the inorganic reinforcing material (C) is less than 40 mass %, the effects of the reinforcing material are not sometimes sufficiently exhibited.

As to a filling material (filler) other than the inorganic reinforcing material (C), an electrically conductive filler, a magnetic filler, a flame retardant filler, or a thermally conductive filler other than the reinforcement filler can be used depending on the purpose. Specific examples of the other filling material include glass beads, glass flakes, glass balloons, silica, talc, kaolin, wollastonite, mica, alumina, hydrotalcite, montmorillonite, hydroxyapatite, graphite, carbon nanotube, fullerene, zinc oxide, indium oxide, tin oxide, iron oxide, titanium oxide, magnesium oxide, aluminum hydroxide, magnesium hydroxide, red phosphorus, calcium carbonate, potassium titanate, led zirconate titanate, barium titanate, aluminum nitride, boron nitride, zinc borate, aluminum borate, barium sulfate, magnesium sulfate, zinc sulfide, iron, aluminum, copper, and silver. These filling materials can be used not only singly but also in combination of several filling materials. The shape of these filling materials is not particularly limited, and a filling material having a needle shape, a spherical shape, a plate shape, an indefinite shape, or the like can be used.

The modified polyolefin resin (D) in the present invention is obtained by modifying the following polyolefin resins. That is, examples include olefin-based resins such as high-density polyethylene, low-density polyethylene, ultra high molecular weight polyethylene, linear low-density polyethylene, polypropylene, poly(1-butene), and poly(4-methylpentene). From the viewpoint of the wear resistance, high-density polyethylene is most preferable among these polyolefin-based resins. The number average molecular weight of the modified polyolefin resin (D) is preferably 50000 to 400000.

High-density polyethylene that has not been modified in the present invention is preferably high-density polyethylene having a number average molecular weight of 50000 to 400000 and a density of 0.94 kg/cm$^2$ or more. When the number average molecular weight is less than 50000, an obtained molded article has insufficient wear resistance. The high-density polyethylene having a molecular weight of more than 400000 makes the molding difficult and is therefore not preferable.

The high-density polyethylene in the present invention may be copolymerized with another monomer, for example, an α-olefin such as propylene, butene-1, pentene, 4-methylpentene-1, hexene, octene, and decene; a diene such as butadiene and isoprene; a cycloolefin such as cyclopentene, cyclohexene, and cyclopentadiene; or an acrylate such as methyl acrylate, ethyl acrylate, and butyl acrylate, as long as the properties of the high-density polyethylene are not impaired.

In order to improve the compatibility with a polyamide resin, the modified polyolefin resin (D) has a reactive functional group that is capable of reacting with a terminal group and/or a main-chain amide group of the polyamide resin. Specific examples of the functional group that is capable of reacting with a polyamide resin include a carboxylic acid group, an acid anhydride group, an epoxy group, an oxadrine group, an amino group, and an isocyanate group. Among these examples, an acid anhydride group is particularly preferable due to its high reactiveness with a polyamide resin. Maleic anhydride is especially preferable.

The blending amount of the modified polyolefin resin (D) is 0.1 to 10 mass %, preferably 0.5 to 7 mass %, and more preferably 1 to 5 mass % in the total resin composition. When the modified polyolefin resin (D) is blended in an appropriate amount, a tough coating layer made from the modified polyolefin can be formed on the outermost layer of a molded article by friction during sliding. Such coating layer can suppress a brittle wear of the polyamide, thereby preventing the inorganic fiber reinforcing material from projecting on the surface layer. The modified polyolefin preferably has a melting point lower than the melting point of the polyamide resins (A) and (B). This is because such a modified polyolefin is melted by friction heat earlier than the polyamide resins and easily forms the surface coating layer. When the amount of the modified polyolefin resin is less than 0.1 mass % in the polyamide resin composition, a sufficiently thick coating layer cannot be formed and the effect of improving the wear resistance is decreased. When the amount of the modified polyolefin resin is greater than 10 mass %, the concentration of the modified polyolefin resin on the surface layer becomes high and the hardness of the surface layer is therefore lowered, thereby the friction coefficient is increased. Further, the mechanical properties of the inorganic reinforced polyamide resin composition are decreased.

In the present invention, the mass ratio between the components (A) and (D) needs to satisfy the following inequality.

$$0.01 \leq (D)/(A) \leq 0.2$$

The mass ratio (D)/(A) is preferably 0.03 or more and 0.18 or less, more preferably 0.04 or more and 0.15 or less, and further preferably 0.05 or more and 0.12 or less. When the mass ratio (D)/(A) is 0.01 or less, a sufficiently thick coating layer cannot be formed and the effect of improving the wear resistance is decreased.

When the mass ratio (D)/(A) is greater than 0.2, the concentration of the modified polyolefin resin on the surface layer becomes high and the hardness of the surface layer is therefore lowered, thereby the friction coefficient is increased. Further, the mechanical properties of the inorganic reinforced polyamide resin composition are decreased.

The inorganic reinforced polyamide resin composition of the present invention preferably has a crystallization temperature during cooling (TC2) of 170° C.≤(TC2)≤190° C., the crystallization temperature being measured by a differential scanning calorimeter (DSC). The crystallization temperature during cooling (TC2) is a peak temperature obtained in the measurement performed, using a differential scanning calorimeter (DSC), under a nitrogen flow, by raising the temperature of the inorganic reinforced polyamide resin composition to 300° C. at a temperature rise rate of 20° C./min, keeping the temperature for 5 minutes, and then lowering the temperature to 100° C. at a rate of 10° C./min.

When the inorganic reinforced polyamide resin composition does not satisfy the crystallization temperature during cooling (TC2) of 170° C.≤(TC2)≤190° C., a higher-level good appearance of a molded article cannot sometimes be obtained due to the crystallization rate of the polyamide resin composition.

The inorganic reinforced polyamide resin composition of the present invention can also contain, as necessary, a heat-resistant stabilizer, an antioxidant, an ultraviolet absorber, a light stabilizer, a plasticizer, a lubricant, a crystal nucleating agent, a mold release agent, an antistatic agent, a flame retardant, a pigment, a dye, or another polymer. The total of the components (A), (B), (C), and (D) preferably account for 90 mass % or more and more preferably account for 95 mass % or more of the inorganic reinforced polyamide resin composition of the present invention.

The method for producing the polyamide resin composition of the present invention is not particularly limited as long as it is a melt-kneading extrusion method that enables accurately controlling the blending amount of the components of the present invention to the prescribed range, but using a single screw extruder or a twin-screw extruder is preferable.

When blending resin pellets having great difference in the shape, apparent specific gravity, friction coefficient, and the like from each other are charged from a hopper of an extruder, the following method is preferably employed.

That is, the crystalline polyamide resin (A), the amorphous polyamide resin (B), and the modified polyolefin resin (D) are preliminarily mixed and charged from a hopper of an extruder and then the inorganic reinforcing material (C) is charged by side feeding.

EXAMPLES

As hereunder, the present invention will be more specifically illustrated by referring to Examples although the present invention is not limited to those Examples.

Raw materials used in examples and comparative examples of the present invention are as follows.

(A) Crystalline Polyamide Resin
    A1: polyamide 6: "T-860" manufactured by TOYOBO CO., LTD., (RV2.0), melting point 225° C.
    A2: polyamide 66: "CM3000EF" manufactured by Toray Industries, Inc., (RV2.4), melting point 265° C.
(B) Amorphous Polyamide Resin
    B: polyamide 6T6I: "GRIVORY G21" manufactured by EMS-CHEMIE HOLDING AG, (RV2.0)
(C) Inorganic Reinforcing Material
    C: glass fiber: "ECS03T-275H" manufactured by Nippon Electric Glass Co., Ltd.
(D) Modified Polyolefin
    D1: Maleic anhydride-modified polyethylene: "Modic DH0200" manufactured by Mitsubishi Chemical Corporation
    D2: Maleic anhydride-modified polypropylene: "MMP-006" manufactured by Prime Polymer Co., Ltd.
    D3: unmodified polyethylene: "6203B" manufactured by Prime Polymer Co., Ltd.
(E) Other Additives
    Mold release agent: calcium montanate: "CS-6CP" manufactured by Nitto Kasei Co., Ltd.
    Stabilizer: copper(II) bromide Various evaluation methods are as follows. Table 1 shows evaluation results.

(1) Relative Viscosity (RV) of Polyamide Resin (96% Sulfuric Acid Solution Method)

The measurement was performed using an Ubbelohde viscosity tube, with a 96 mass % sulfuric acid solution at 25° C., at a concentration of the polyamide resin of 1 g/dl.

(2) Melting Point of Polyamide Resin

The endothermic peak temperature was obtained by performing measurement with a differential scanning calorimeter (EXSTAR 6000 manufactured by Seiko Instruments Inc.), at a temperature rise rate of 20° C./min.

(4) Melt Flow Index (MFR)

The measurement was performed in accordance with ISO1133. Measurement temperature: 275° C., load: 5 kg (5) Flexural Strength The measurement was performed in accordance with ISO178.

(6) Charpy Impact Resistance Strength

The measurement was performed in accordance with ISO179-1.

(7) Number Average Fiber Length

The length of residual glass fibers in pellets was measured by the following method.

It is difficult to obtain the accurate fiber length of glass fibers in a material highly filled with the glass fibers because the glass fibers are easily damaged during measurement due to their frequent mutual interference. Therefore, in order to accurately measure the length of the glass fibers, the number average fiber length was measured in the present invention by the following method. Pellets which had been obtained through melt kneading were heated at 650° C. for a little over 2 hours, whereby glass fibers were extracted as an ash content without damaging the glass fibers. Then, the obtained glass fibers were soaked in water. Then, the dispersed glass fibers were taken out onto a prepared slide. And then, arbitrarily selected 1000 or more glass fibers were observed with a digital microscope (KH-7700 manufactured by Hirox Co., Ltd.) at 80-fold magnification.

(8) Wear Properties

Using a thrust wear testing machine, a flat plate (size: 50 mm×50 mm) of the polyamide resin composition obtained by injection molding was brought into contact with and continuously slid over a cylindrical molded article (outer diameter: 20 mm, inner diameter: 14.4 mm, contact area: 1.51 cm$^2$) made from the same material as the flat plate under the conditions of a period of 60 minutes, an applied load of 55.5 kgf/cm$^2$, and a speed of 5 cm/sec. Thereafter, the dynamic friction coefficient was calculated from the amount of wear per unit distance (mg/km) and the convergent value of load during the wear test, wherein the amount of wear was obtained from the difference in mass of the flat plate and the cylindrical molded article between before and after the wear, and the total wear distance.

(9) Method for Evaluating Appearance of Molded Article:

The specular gloss was measured as the appearance of the molded article by the following method and evaluated.

A molded article was produced using a mold (100 mm×100 mm×3 mm (thickness)) for specular finishing, at a resin temperature of 280° C. and a mold temperature of 80° C. Then, the gloss at an incident angle of 60 degrees of the molded article was measured in accordance with JIS Z-8714. (The gloss is better with a higher numerical value.)

The gloss measurement result was evaluated on the basis of the following determination criteria.
oo: 97 or more
o: 95 or more and less than 97
Δ: 90 or more and less than 95
×: less than 90

Examples 1 to 5, 7 and Comparative Examples 1 to 6

An aqueous solution of copper(II) bromide was used as a copper compound. The raw materials other than the inorganic reinforcing material were preliminarily mixed so as to satisfy the composition shown in Table 1. The preliminarily mixed raw materials other than the inorganic reinforcing material were charged from a hopper of a twin-screw extruder (TEM-75SS, SHIBAURA MACHINE CO., LTD.). The twin-screw extruder has, seen from the upstream side of the extruder, a main feeder (hopper) at a first barrel, and further a first side feeder at a fourth barrel and a second side feeder at an eighth barrel. The inorganic reinforcing material was charged from the second side feeder of the twin-screw extruder. The raw materials were compounded, with the temperature of a cylinder of the twin-screw extruder set to 280° C. and the screw rotation rate to 180 rpm, and formed into pellets. The obtained pellets were dried in a hot-air dryer so as to reach a moisture percentage of 0.05% or less, and then evaluated for the various properties. Table 1 shows the evaluation results.

Example 6

The raw materials were compounded and formed into pellets similarly to Example 1 except that the inorganic reinforcing material was charged from the first side feeder of the twin-screw extruder. The obtained pellets were dried in a hot-air dryer so as to reach a moisture percentage of 0.05% or less and then evaluated for the various properties. Table 1 shows the evaluation results.

TABLE 1

| | | | Example 1 | Example 2 | Example 3 | Example 4 | Example 5 | Example 6 | Example 7 |
|---|---|---|---|---|---|---|---|---|---|
| Blending composition | crystalline polyamide A1 | mass % | 32.35 | 27.35 | 20.35 | 37.35 | 47.35 | 32.35 | 32.35 |
| | crystalline polyamide A2 | mass % | 0 | 5 | 12 | 0 | 0 | 0 | 0 |
| | amorphous polyamide B | mass % | 5 | 5 | 5 | 5 | 5 | 5 | 5 |
| | inorganic fiber reinforcing material C | mass % | 60 | 60 | 60 | 55 | 45 | 60 | 60 |
| | modified polyolefin D1 | mass % | 2 | 2 | 2 | 2 | 2 | 2 | |
| | modified polyolefin D2 | mass % | | | | | | | 2 |
| | modified polyolefin D3 | mass % | | | | | | | |
| | mold release agent | mass % | 0.6 | 0.6 | 0.6 | 0.6 | 0.6 | 0.6 | 0.6 |
| | stabilizer | mass % | 0.05 | 0.05 | 0.05 | 0.05 | 0.05 | 0.05 | 0.05 |
| | (D)/(A) | — | 0.06 | 0.06 | 0.06 | 0.05 | 0.04 | 0.06 | 0.06 |
| | (B)/(A) | — | 0.15 | 0.15 | 0.15 | 0.13 | 0.11 | 0.15 | 0.15 |
| | (A2)/(A1) | ° C. | 0.0 | 0.2 | 0.6 | 0.0 | 0.0 | 0.0 | 0.0 |
| | MFR | g/10 min | 18 | 15 | 12 | 23 | 35 | 20 | 15 |
| | number average fiber length | μm | 230 | 230 | 230 | 230 | 230 | 110 | 230 |
| Composition properties | flexural strength | MPa | 335 | 340 | 348 | 315 | 289 | 210 | 340 |
| | charpy impact resistance strength | kJ/m$^2$ | 17 | 16 | 13 | 14 | 10 | 12 | 18 |
| | amount of wear (flat plate) | mg | 5.6 | 4.0 | 6.3 | 11 | 15 | 7.0 | 6.5 |
| | dynamic friction coefficient | — | 0.11 | 0.08 | 0.12 | 0.15 | 0.17 | 0.14 | 0.13 |
| | appearance of molded article | — | o | oo | Δ | o | o | o | o |

| | | | Comparative Example 1 | Comparative Example 2 | Comparative Example 3 | Comparative Example 4 | Comparative Example 5 | Comparative Example 6 |
|---|---|---|---|---|---|---|---|---|
| Blending composition | crystalline polyamide A1 | mass % | 37.35 | 34.35 | 26.35 | 20.35 | 18.35 | 32.35 |
| | crystalline polyamide A2 | mass % | 0 | 0 | 0 | 0 | 0 | 0 |
| | amorphous polyamide B | mass % | 0 | 5 | 5 | 17 | 15 | 5 |
| | inorganic fiber reinforcing material C | mass % | 60 | 60 | 60 | 60 | 60 | 60 |
| | modified polyolefin D1 | mass % | 2 | 0 | 8 | 2 | 6 | |
| | modified polyolefin D2 | mass % | | | | | | |
| | modified polyolefin D3 | mass % | | | | | | 2 |
| | mold release agent | mass % | 0.6 | 0.6 | 0.6 | 0.6 | 0.6 | 0.6 |
| | stabilizer | mass % | 0.05 | 0.05 | 0.05 | 0.05 | 0.05 | 0.05 |
| | (D)/(A) | — | 0.05 | 0.00 | 0.30 | 0.10 | 0.33 | 0.06 |
| | (B)/(A) | — | 0.00 | 0.15 | 0.19 | 0.84 | 0.82 | 0.15 |
| | (A2)/(A1) | ° C. | 0 | 0 | 0 | 0 | 0 | 0 |
| | MFR | g/10 min | 19 | 17 | 24 | 20 | 23 | 24 |
| | number average fiber length | μm | 230 | 230 | 230 | 230 | 230 | 230 |

TABLE 1-continued

| Composition properties | flexural strength | MPa | 336 | 337 | 175 | 310 | 260 | 325 |
|---|---|---|---|---|---|---|---|---|
| | charpy impact resistance strength | kJ/m² | 18 | 19 | 9 | 14 | 11 | 15 |
| | amount of wear (flat plate) | mg | 183 | 325 | 38 | 29 | 530 | 32 |
| | dynamic friction coefficient | — | 0.28 | 0.55 | 0.21 | 0.24 | 0.80 | 0.22 |
| | appearance of molded article | — | x | x | ○ | x | x | Δ |

As is clear from the results in Table 1, the mechanical properties and the wear resistance are balanced at high level in Examples 1 to 7 which are within the range of the present invention. On the other hand, Comparative Examples 1 and 2 that contain no modified polyolefin or amorphous polyamide resin have bad wear resistance and bad molded appearance. Comparative Example 3 having a ratio (D)/(A) out of the range has low mechanical properties. Comparative Example 4 having a ratio (B)/(A) out of the range has degraded appearance of the molded article, such as outstanding glass floating, and also has low wear resistance.

INDUSTRIAL APPLICABILITY

The polyamide resin composition according to the present invention achieves incompatible mechanical properties, i.e., high stiffness and impact resistance, and can therefore be used in place of a metal or for thin molded articles. Also, the polyamide resin composition according to the present invention has excellent flowability and is further a high-stiffness and high-sliding material having excellent long-term wear resistance to a molded article used as a counterpart material, in which the molded article is made from a resin composition containing an inorganic fiber reinforcing material. It is therefore possible to easily produce an inorganic reinforced polyamide resin composition that can be used for widely applied high-sliding components and can be used in place of a metal, and a molded article of the inorganic reinforced polyamide resin composition. Accordingly, the polyamide resin composition according to the present invention is very useful because it can realize unprecedented downsizing of housings of electronic and electric components, vehicle components used for the interior and exterior of vehicles, and the like.

The invention claimed is:

1. An inorganic reinforced polyamide resin composition containing: 10 to 55 mass % of a crystalline polyamide resin (A); 1 to 20 mass % of an amorphous polyamide resin (B); 40 to 70 mass % of an inorganic reinforcing material (C); and 0.5 to 10 mass % of a modified polyolefin resin (D) having a reactive functional group that is capable of reacting with a terminal group and/or a main-chain amide group of a polyamide resin, wherein a blending mass ratio between the components (A) and (D) satisfies 0.01≤(D)/(A)≤0.2, a blending mass ratio between the components (A) and (B) satisfies 0.05≤(B)/(A)≤0.7, the crystalline polyamide resin (A) is an aliphatic polyamide, the crystalline polyamide resin (A) contains a crystalline polyamide resin (A1) and a crystalline polyamide resin (A2) having a melting point higher than a melting point of the crystalline polyamide resin (A1) by 20° C. or more, a blending mass ratio between the components (A1) and (A2) is 0.1≤(A2)/(A1)≤0.5, and the inorganic reinforcing material (C) is glass fibers having a circular cross-section and a number average fiber length of 140 µm or more and 400 µm or less.

2. The inorganic reinforced polyamide resin composition according to claim 1, in which the modified polyolefin resin (D) is a modified polyethylene resin.

* * * * *